Patented Oct. 15, 1935

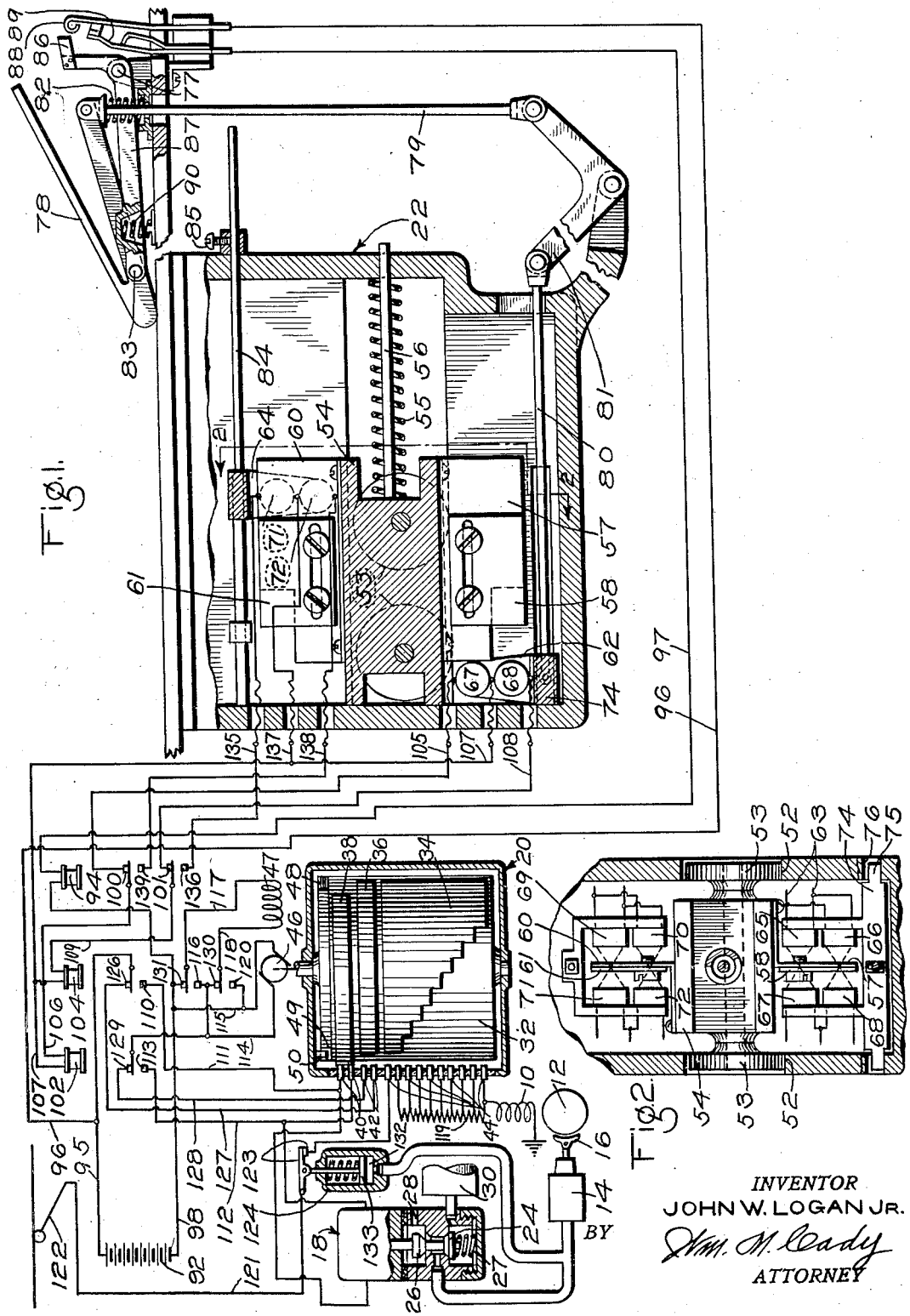

2,017,667

UNITED STATES PATENT OFFICE 2,017,667

RETARDATION CONTROLLING DEVICE

John W. Logan, Jr., Edgewood, Pa., assignor to The Westinghouse Air Brake Company, Wilmerding, Pa., a corporation of Pennsylvania Application December 22, 1934, Serial No. 758,769

21 Claims. (Cl. 303—24)

This invention relates to retardation controlling devices, and more particularly to vehicle brake systems in which a retardation controlling device is employed to control operation of an electric brake and a fluid pressure brake.

A desirable type of brake to employ in connection with trains and traction vehicles intended for high speed service is the type of electrodynamic brake commonly referred to as the eddy current brake. A feature of this brake is that there are no frictionally engaging parts, as in the commonly known friction type brake, and consequently there is less wear than in the friction type brake where the constant rubbing of parts during braking wastes away the material of the active braking elements. Another feature of importance in connection with the eddy current brake is that it may be designed to produce a substantially constant braking effect over a wide range of vehicle speeds, so that a very nearly constant rate of retardation may be maintained for the greater portion of a deceleration period.

However, as the speed of the vehicle diminishes toward zero, the braking effect of the eddy current brake will at some very low speed begin to decrease, first slowly and then rapidly, until at zero speed the eddy current brake will produce no braking effect. Where eddy current brakes are employed, therefore, it is common practice to supplement this type of brake with a friction type brake, so that at the end of the deceleration period the friction brake can be cut into action to insure stopping of the vehicle and to hold the vehicle, or train, at rest.

While an eddy current brake may be designed to produce a substantially constant braking effect over the greater part of a deceleration period, and hence produce a substantially constant rate of retardation over that period, if there are fluctuations in the current supplied to energize the brake, then the rate of retardation which results will not be constant. If the fluctuations in the current supply are small, the variations in the rate of retardation may be tolerable, but if the fluctuations are relatively large, as is common in connection with trains or vehicles which receive a supply from a trolley or third rail, then the variations in the rate of retardation may be objectionable.

In a like manner, if the load of the vehicle or train varies over wide limits, which it does in most cases, even though the braking effect produced by the eddy current brake were maintained constant, a constant rate of retardation could not be maintained, because the mass to be decelerated varies. In order to maintain a substantially constant rate of retardation, it is desirable that some means be provided to vary the braking effect produced by the eddy current brake as the rate of retardation varies, so that the braking effect will be varied to compensate for the changes in load and fluctuations in current supply.

It is therefore a principal object of the present invention to provide a brake apparatus employing an eddy current brake, in which operation of the eddy current brake is controlled by a retardation controller device, which will so control the eddy current brake as to produce a substantially constant rate of retardation, regardless of variations in load or fluctuations in current supply.

Another object of the invention is to provide a combined eddy current and fluid pressure brake system, in which the eddy current brake and the fluid pressure brake are both under the control of a retardation controller device, which functions to cut the fluid pressure brake into action only at the end of the stop where the eddy current brake is diminishing in braking effect, or upon a loss of current supplied to the eddy current brake.

A yet further object of the invention is to provide a brake system of the character above referred to which incorporates a "deadman", or safety control feature which functions upon operation thereof to cut the eddy current brake into action to a maximum degree.

A yet further object of the invention is to provide a retardation controller device for controlling the eddy current brake in which any desired rate of retardation from zero to a maximum may be selected by the manual movement of a control element.

A still further object of the invention is to provide a retardation controller device of this type, which is sometimes referred to as a "brake valve type" retardation controller device, in which photo-electric means are employed for controlling applications of the brakes, and also in which adjustments may be simply made for varying the "lap" or "hold" period of the brakes.

A still further object of the invention is to provide a retardation controller device of the type just referred to, and a control system in connection therewith, which will operate upon burning out of photo lamps employed to effect an application of the brakes.

Further and more specific objects of the invention will be apparent from the following description, which is taken in connection with the attached drawing, wherein, Figure 1 is a schematic view, partly diagrammatic, showing one adaptation of the invention in connection with the control of a single eddy current brake device and a single fluid pressure brake device.

Figure 2 is a partial view of the retardation controller device shown to the right in Figure 1, along the line 2—2.

In the embodiment shown, I have diagrammatically indicated the eddy current brake by a winding 10, associated with a stator member, and by a rotor 12. As is commonly known in the art, when the stator winding, or windings, 10 are energized, a magnetic flux is produced in the rotor member 12, which is preferably of magnetic material such as iron or steel, and the eddy currents induced in the rotor react with the flux to produce a braking effect.

The fluid pressure brake may be apart from or combined with the eddy current brake, and in the illustration I have shown the two as combined, the fluid pressure brake comprising a brake cylinder 14 adapted to operate a shoe 16 into engagement with the periphery of the rotor 12. The brake shoe 16 could of course be replaced by a brake band, and the two brake devices combined somewhat in the manner shown in the pending application of George W. Baughman, Serial No. 696,981, filed November 7, 1933. The present application and that referred to are owned by a common assignee.

For controlling the supply of fluid under pressure to the brake cylinder 14, I provide a magnet valve device 18, and for controlling the supply of current to the eddy current brake winding 10, and for controlling certain interlocking features between the eddy current and fluid pressure brake devices, I provide a controller device 20.

For controlling operation of the controller device 20, in order to maintain a selected rate of retardation, I provide a variable rate or "brake valve type" retardation controller device 22, similar to that described and claimed in my copending application Serial No. 707,282, filed January 19, 1934.

Considering now more in detail these devices, the magnet valve device 18 is embodied in a casing having disposed therein a supply valve 24 and a release valve 26, urged toward seated and unseated positions, respectively, by a spring 27. When these two valves are in these positions, the brake cylinder is in communication with the atmosphere, past the unseated release valve 26, and by way of port 28.

The release valve 26 is urged toward seated position and the supply valve 24 toward unseated position by action of an electromagnet in the upper part of the casing, which when energized actuates the two valves downwardly. When the release valve is seated and the supply valve is unseated, fluid under pressure may flow from a reservoir 30, past the unseated supply valve 24, to the brake cylinder 14.

The controller device 20 is embodied in a casing having rotatively disposed therein a drum 32 having secured thereto and insulated therefrom contact segments 34, 36 and 38. As will appear more fully presently, these contact segments are adapted to engage contact fingers 40, 42 and 44, for a purpose which will appear more fully in the description of operation of this embodiment.

The drum 32 is rotated either forward or backward by a motor having an armature 46 and field winding 47. The degree of rotation of the drum 32 is limited by engagement of stop faces 48 and 49 on the drum with a stop member 50 secured to the casing of the controller device.

The retardation controller device 22 is embodied in a casing having a trackway 52 for wheels 53 secured to and carrying a movable body 54. The body 54 is urged to the left to a biased position by a spring 55, which is concentrically disposed on a rod 56 having one end secured to the body 54 and the other end slidably interfitting with a bore in the casing. The retardation controller device 22 is positioned on the train or vehicle so that when the train or vehicle is decelerating, the body 54 is urged to the right, against opposition of the spring, according to the rate of retardation of the vehicle or train. The rod 56 serves to guide the movement of the body.

Rigidly secured to the under side of the body 54 is a downwardly projecting fin 57, and adjustably secured to this fin is a second fin 58. In a similar manner, secured to and projecting from the upper side of the body 54 is another fin 60, also having adjustably secured thereto an adjustable fin 61.

The fins 57 and 58 are adapted to control operation of a service photo-electric means, preferably of the type sometimes referred to briefly as photo-electric cell devices, designated in its entirety by the numeral 62. The fins 60 and 61 are similarly adapted to control operation of like emergency photo-electric means designated in its entirety by the numeral 64.

As may be more clearly seen from Figure 2, the photo-electric means 62 comprises two lamps 65 and 66, which are adapted to be connected to a suitable source of current supply by conductors 63, and which are adapted to produce light beams which when uninterrupted impinge upon, respectively, photo-electric cell devices, or like devices 67 and 68, the light beams being as depicted by the dotted lines shown. The characteristic of the photo-electric cell devices 67 and 68 of importance is that each of these devices will produce an electric current when a beam of light is impinged thereon, but when the beam of light is interrupted, as by the passage of the fins 57 or 58 between the lamp source and the photo-electric cells, the electric current will immediately diminish substantially to zero or to a low ineffective value.

The photo-electric means 64 is substantially a duplicate of the photo-electric means 62, but for the sake of clarity in the following description the parts will be designated by different numerals, the lamps being designated by the numerals 69 and 70, and the photo-electric cell devices by the numerals 71 and 72.

The photo-electric means 62 is mounted on a slide or cross-head member 74 having tongues 75 adapted to slide in a slot-way 76. The slide 74 may be moved backward and forward by operation of the toe portion of a foot pedal 78. The foot pedal is coupled to the slide 74 by means of rods 79 and 80, and bell crank lever 81. A spring 82 urges the toe portion of the foot pedal 78 upwardly and hence normally positions the slide member 74 to a biased position to the left, as shown in the drawing.

The photo-electric means 64 is preferably suspended from and secured to an adjusting rod 84, which may be moved back and forth to position the photo-electric means in any desired position. A set screw 85 is employed to lock the photo-electric means in any one position.

The foot pedal 78 is adapted to be operated both by pressure from the operator's toe and by pressure from the operator's heel. When pressure is applied by the operator's heel, the heel portion of the foot pedal is depressed, as is shown in Figure 1, pivoting about the axis 77, and in this position insulating member 86 of a bell crank lever 87 disengages from a contact 88 to permit it to engage another contact 89, for a purpose which will appear more fully presently. When the pressure is released on the heel portion of the foot pedal, a spring 90 rotates the bell crank lever 87 to cause disengagement of these two contacts.

The operation of this embodiment of my invention is as follows:

Running condition

When the vehicle or train with which the embodiment is associated is running, the operator holds the heel portion only of the pedal 78 depressed, and permits the toe portion to rise to its uppermost position. Depressing the heel portion permits the two contacts 88 and 89 to engage, thus energizing an emergency relay 94 from a battery 92 through a circuit which, beginning at the battery, includes conductors 95 and 96, contacts 88 and 89, conductor 97, relay 94, and conductor 98. The emergency relay will then close its front contacts 100 and 101, as shown in Figure 1.

In the retardation controller device 22, spring 55 will hold body 54 in its biased position to the left, and the light beams from the lamps 65 and 66 will be impinged on the photo-electric devices 67 and 68, respectively, because the fins 57 and 58 will be too far to the right to intercept the light beams. Therefore, when emergency relay 94 closes its front contacts, a relay 102 will be connected to the photo-electric cell device 67, and a relay 104 will be connected to the photo-electric cell device 68.

The circuit to the relay 102, beginning at the photo-electric cell device 67, includes conductor 105, front contact 100, conductor 106, relay 102, and conductor 107. The circuit to the relay 104, beginning at the photo-electric cell device 68, includes conductor 108, front contact 101, conductor 109, relay 104, and conductor 107. Relays 102 and 104 will each close its front contacts, as indicated in the drawing, and, as will appear presently, this will cause the drum 32 of the controller device 20 to be maintained in the release position shown in the drawing. In this release position, the controller device 20 maintains the magnet valve device 18 deenergized, so that the brake cylinder 14 is vented to the atmosphere. At the same time, the circuit to the eddy current brake winding 10 is opened, so that this brake device is ineffective. Both the eddy current and the fluid pressure brakes are thus held released.

Normal application of the brakes

When it is desired to effect a normal application of the brakes, the toe portion of the foot pedal 78 is depressed, pivoting about the axis 83, an amount in accordance with a desired rate of retardation. That is, the operator selects the desired degree of braking by selecting a desired rate of retardation. When the toe portion of the foot pedal is depressed, the connecting rods and levers actuate the slide member 74 to the right to a degree corresponding to the degree of downward movement of the foot pedal. Assuming for the sake of illustration that the foot pedal is depressed to some mid position, when the slide member 74 moves to the right, the fin 57 intercepts the light beam from the lamp 65 to the photo-electric cell device 67, and the adjustable fin 58 intercepts the light beam from the lamp 66 to the photo-electric cell device 68.

During this movement the fins 60 and 61 continue to intercept the beams in the emergency photo-electric means 64.

Interception of the two beams from the two lamps 65 and 66 deenergizes both relays 102 and 104, and the movable contact elements of these relays drop to close the back contacts of the relays. Current is then supplied to both the armature 46 and field winding 47 of the drum motor. The circuit for the armature winding is, beginning at the upper terminal of battery 92, through conductor 95, back contact 110, conductor 111, fingers 40, which are now bridged by contact segment 38, conductor 112, back contact 113, conductor 114, armature 46, and conductors 115 and 98 to the lower terminal of battery 92. The circuit to the field winding 47 includes that just described up to and including conductor 114, and from thereon, back contact 116, conductor 117, field winding 47, conductor 118, back contact 120, and conductors 115 and 98.

The supply of current to the drum motor is in a direction such that the motor drives the drum toward application position, that is the contact segments 34, 36 and 38 move to the left as viewed in Figure 1. The contact segment 34 engages the contact fingers 44, to connect the eddy current brake winding 10 to a source of power supply through a variable resistance 119, conductor 121 and trolley 122. It will be noted that this circuit includes contacts 123 of a pneumatic switch device 124, of which more will be said later.

The drum contact segment 38 maintains connection between the contact fingers 40, and the drum contact segment 36 engages the two contact fingers 42, but these latter two contact fingers are connected to the front contacts of the relays 102 and 104 and no function is performed as a result at this time.

When current is supplied to the eddy current brake winding 10 a braking effect is produced on the rotor 12 and hence on the vehicle or train. The train will therefore begin to decelerate and the resulting force of inertia acting upon the body 54 will urge it to the right.

When the body 54 has been urged to the right far enough for fin 58 to again permit the light beam from lamp 66 to impinge on the photo-electric cell device 68, relay 104 will be energized. Energization of this relay will interrupt the current supply to the drum motor and the drum will cease rotating, the friction of the drum being sufficient to arrest and hold the drum in any position in which the motor is not driving it. The current supply to the eddy current brake winding 10 will then be held constant, or "lapped" as it is commonly called in connection with fluid pressure brakes.

Now if it be assumed that the eddy current brake is designed to produce a substantially constant braking effect during the greater part of the deceleration period, then if the supply current is maintained constant, the rate of retardation will likewise be constant. If however the trolley voltage should vary and increase appreciably, the current supply to the brake winding 10 will increase, and the resulting higher rate of retardation will move the body 54 further to the right. If the body is moved far enough for fin 57 to permit the beam from lamp 65 to impinge on photo-electric cell device 67, then relay 102 will be energized. The result of energization of relays 102 and 104 is to supply current to the drum motor in a direction such that the drum is rotated toward release position.

The circuit to the drum motor then includes, beginning at the upper terminal of the battery 92, conductor 95, front contact 126, conductor 127, contact fingers 42, which are now bridged by contact segment 38, conductor 128, front contact 129, conductor 114, armature 46, and conductors 115 and 98. The circuit to the field winding 47 includes, beginning at conductor 114, front contact 130, conductor 116, field winding 47, conductor 117, front contact 131, and conductor 98. It will be noted that the direction of current flow in the armature 46 is the same as before, but the direction of current flow in the field winding 47 has been reversed. This causes the rotation of the drum in the opposite direction, as before stated, to cut in more of the resistance 119.

Of course as soon as the trolley voltage decreases, the retardation controller body 54 will again move to the left to deenergize relay 102, and the "lap" condition previously obtaining will again result.

If the trolley voltage decreases still further, the body 54 will move to the left to interrupt both light beams from the lamps 65 and 66. This will deenergize both relays 102 and 104, and will cause the drum 32 to be rotated further toward application position to cut out additional portions of resistance 119. It should therefore be obvious that if the fluctuations in trolley voltage are great enough, the body 54 will move backwards and forwards to cause the current supply to the eddy current brake winding 10 to be increased or decreased, as the case may require, to maintain a rate of retardation according to the degree to which the foot pedal 78 has been depressed.

The amount drum 32 is rotated will also depend upon the load in the train or vehicle. If the train or vehicle is lightly loaded, then for a given movement of the foot pedal 78 the drum need only be rotated through a corresponding small angle to energize the eddy current brake sufficiently to produce enough braking force to obtain the desired rate of retardation. If the vehicle is heavily loaded, the drum must be rotated through a correspondingly greater angle to obtain the desired rate of retardation. The rotation of the drum is then variable but depends ultimately upon the position of the foot pedal 78, and regardless of voltage fluctuations or variations in load, the drum will be operated to produce the required braking effect by the eddy current brake necessary to maintain the rate of retardation selected.

Now as the speed of the vehicle or train diminishes, a low speed will be reached at which the braking effect produced by the eddy current brake will diminish even though the current supplied thereto is maintained constant. If the foot pedal is still held in a given position, the drum 32 will then be operated further and further toward application position to supply more and more current to the winding 10, to compensate for the decrease in braking effect due to decrease in speed of the vehicle or train.

When the drum has been rotated far enough for contact segment 38 to disengage from fingers 40, the electromagnet of the magnet valve device 18 will be connected in series with the motor armature 46 and field winding 47. The stop lug 50 will then engage the stop face 48 on the drum 32, so that the motor cannot rotate the drum any further, and the current supplied to the motor will energize the electromagnet in the magnet valve device 18, to seat the release valve 26 and unseat the supply valve 24. Fluid under pressure will then flow from the reservoir 30 to the brake cylinder 14, to cause engagement of the brake shoe 16 with the periphery of rotor 12.

Now the parts are so designed that the fluid pressure brake is thus cut into action at a low speed, as for example from 4 to 8 miles per hour, and the rate of supply of fluid under pressure to the brake cylinder is such that the actual stopping of the vehicle or train is mainly accomplished by the eddy current brake. The brake cylinder pressure builds up only fast enough to insure that the train will be stopped, whether on a grade or on a level trackway, and to insure that it will be held at rest after it stops.

When fluid under pressure is supplied to the brake cylinder 14, it also flows to a chamber 132 in the pneumatic switch device 124, where it actuates piston 133 upwardly to open contacts 123. The supply of current to the eddy current brake winding 10 is thereby cut off, and the eddy current brake device is rendered ineffective. This cutting out of the eddy current brake device is intended to take place slightly after the vehicle or train comes to a stop, or coincidently therewith, so as not to waste electrical energy while the train or vehicle is at rest.

If at any time it is desired to effect a release of the brakes, pressure is released from the toe portion of the foot pedal 78, whereupon the slide member 74 is again positioned to its biased position to the left. Both relays 102 and 104 will then again be energized, and if the drum 32 is in any application position it will be rotated toward release position, thus deenergizing the eddy current brake winding 10. If the magnet valve device 18 has been energized, it also will be deenergized, to release fluid under pressure from the brake cylinder.

It is to be noted that the operator may vary the braking at any time by selecting a new rate of retardation with different pressure on the toe portion of the foot pedal. For every movement then of the toe portion of the foot pedal, there is an immediate response in the braking effect produced.

*Safety control brake application*

The operator maintains pressure on the heel portion of the foot pedal so long as the train is running or during a normal brake application. If through accident or design pressure is released from the heel portion, spring 90 will rotate the bell crank lever 87 to open contacts 88 and 89. Opening of these contacts deenergizes the emergency relay 94, thereby opening its front contacts and closing its back contacts. Closing of these back contacts connects relay 104 to the photo-electric cell device 71, and the relay 102 to the photo-electric cell device 72. The circuit to relay 104, beginning at the photo-electric cell device 71, includes conductor 135, back contact 136, conductor 109, relay 104, and conductors 107 and 137. The circuit to relay 102, beginning at the photo-electric cell device 72, includes conductor 138, back contact 139, conductor 106, relay 102, and conductors 107 and 137. The effect of releasing the pressure on the heel portion of the foot pedal is then to transfer control of relays 102 and 104 from the service photo-electric means 62 to the emergency photo-electric means 64.

As will be observed from the drawing, the fins 60 and 61 are so positioned that the light beams in the photo-electric means 64 are intercepted until the body 54 will have moved to some far position to the right. It is intended that the photo-electric means 64 shall be positioned so that a maximum rate of retardation will be obtained which corresponds to that for the maximum distance which the toe portion or foot pedal 78 may be depressed. In other words, release of pressure from the heel portion of foot pedal 78 is intended to always produce sufficient braking to produce a maximum rate of retardation.

When the body 54 has moved far enough to the right for fin 61 to pass from between lamp 69 and photo cell 71, relay 104 will be again energized and a "hold" or "lap" condition will result. Thereafter, the retardation controller device 22 and controller device 20 will function cooperatively to produce the maximum rate of retardation.

If at any time during a normal brake application, there should be a loss of power, as for example should the trolley 122 leave the trolley wire, the eddy current braking effect will decrease to zero and consequently the rate of retardation will decrease. The body 54 of the retardation controller device will then move to the left, to cause the drum 32 to be rotated to the extreme application position, and the fluid pressure brake will as a result be applied.

As the pressure in the brake cylinder 14 builds up, the body 54 will again move to the right and will operate relays 102 and 104 to cause the drum 32 to be rotated toward release position. However, as soon as the drum has been rotated far enough for contact segment 38 to bridge contact fingers 40, the magnet valve device 18 will be de-energized, and the supply to the brake cylinder will be cut off and fluid under pressure will be released from the brake cylinder. The resulting decrease of braking effect will cause the body 54 to again move to the left, the drum 32 will again be rotated to extreme application position, and the magnet valve device 18 will again be energized to resupply fluid under pressure to the brake cylinder.

A little thought will show that the retardation controller device will cycle thereafter to cause the drum contact 38 to intermittently engage and disengage from contact fingers 40 to maintain whatever brake cylinder pressure is required to obtain a rate of retardation according to the position of the foot pedal 78.

It will therefore be apparent that the retardation controller device will control either the electric brake or the fluid pressure brake, whichever is operative during a normal brake application. In addition, during a safety control application the retardation controller device will function to maintain a maximum rate of retardation.

It is to be also noted that if the "lap" or "hold" periods are other than desired, the fins 58 and 61 may be adjusted to shorten or lengthen these periods as desired.

If both lamps 65 and 66 should burn out, then the electric brake will be applied in the same manner as if the slide 74 had been actuated to the extreme position to the right. The same holds if the photo-electric cell devices 67 and 68 should fail to produce electric currents while lamps 65 and 66 are burning. If only one cell or lamp should fail it will be obvious that a limited control over operation of the controller device 20 is still retained by the retardation controller device.

While I have illustrated my invention by one embodiment thereof, it is to be understood that I do not wish to be limited to this embodiment or otherwise than by the spirit and scope of the appended claims.

Having now described my invention, what I claim as new and desire to secure by Letters Patent, is:

1. In a vehicle brake system, in combination, an electric brake device having a winding and being operable to produce a braking effect in accordance with the degree of energization of said winding, a circuit for supplying current to said winding, a retardation controller device having a first body manually movable a distance in accordance with a desired rate of retardation and having a second body movable according to the rate of retardation of the vehicle, means operative upon movement of said first body for supplying current to said winding at an increasing rate, and means operative upon movement of said second body for holding said winding energized at a substantially constant current.

2. In a vehicle brake system, in combination, an electric brake device having a winding and being operable to produce a braking effect according to the degree of energization of said winding, a retardation controller device having a first body movable manually a distance in accordance with a desired rate of retardation and having a second body movable according to the rate of retardation of the vehicle, means responsive to movement of said first body for supplying current to said winding at an increasing rate, and means responsive to movement of said second body for causing said last mentioned means to diminish said rate of supply.

3. In a vehicle brake system, in combination, an electric brake device having a winding and being operable to produce a braking effect according to the degree of current supplied to said winding, a controller device operable to different application positions to supply different degrees of current to said winding and operable toward release position to diminish the degree of current supplied to said winding, a retardation controller device having a first body manually movable according to a desired rate of retardation and a second body movable toward and beyond said first body according to the rate of retardation of the vehicle, means responsive to movement of said first body for causing said controller device to be operated to an application position, and means responsive to movement of said second body beyond said first body for causing said controller device to be operated toward release position.

4. In a vehicle brake system, in combination, an electric brake device having a winding and being operable to produce a braking effect according to the degree of energization of said winding, a device responsive to a light beam for producing an electric current, means for producing a light beam impinged on said device, means responsive to current produced by said second device for controlling the degree of energization of said winding, and means controlled according to the rate of retardation of the vehicle for controlling the impingement of said light beam on said device.

5. In a vehicle brake system, in combination, an electric brake device having a winding and being operable to produce a braking effect corresponding to the degree of current supplied to said winding, a control device operable to different application positions to supply current to said winding to different degrees and operable toward release position to decrease the supply of current to said winding, two photo-electric devices each of which is operable to produce an electric current, means rendered operable upon decay of the current produced by both of said photo-electric devices for causing said control device to be operated to an application position and operable upon current being produced by one of said devices for arresting said control device in application position and operable upon current being produced by both of said devices for operating said control device toward release position, and means operable according to the rate of retardation of the vehicle for controlling the current produced by said photo-electric devices.

6. In a vehicle brake system, in combination, an electric brake device having a winding and being operable to product a braking effect according to the degree of energization of said winding, photo-electric means having a light responsive device and light producing device producing a beam of light impinged upon said light responsive device, a body movable according to the rate of retardation of the vehicle, means carried by said body for interrupting the light beam produced by said light producing device, means for manually actuating said photo-electric means to a position where said last mentioned means interrupts said light beam, means responsive to interruption of said light beam for supplying current to said winding at an increasing rate, means whereby movement of said body reestablishes said light beam on said light responsive device, and means responsive to reestablishment of said light beam on said light responsive device for effecting a substantially constant supply of current to said winding.

7. In a vehicle brake system, in combination, an electric brake device having a winding and being operable to produce a braking effect which varies according to the energization of said winding, photo-electric means including two light responsive devices operable when a beam of light is impinged on each to produce electric currents and also including two light producing devices for impinging beams of light on said two light responsive devices, means for actuating said photo-electric means away from a biased position a distance in accordance with a desired rate of retardation, interrupting means for sequentially interrupting said light beams when said photoelectric means is moved, current controlling means responsive to interruption of said light beams for supplying current to said winding at an increasing rate, a body operable according to the rate of retardation of the vehicle for moving said interrupting means to sequentially reestablish said light beams, means responsive to reestablishment of one of said light beams for causing said current controlling means to supply substantially constant current to said winding, and means responsive to establishment of both of said light beams for causing said current controlling means to diminish the supply of current to said winding.

8. In a vehicle brake system, in combination, an electric brake device having a winding and being operable to produce a braking effect corresponding to the degree of current supplied to said winding, two control circuits, photo-electric means operable to supply current to each of said circuits, manually operated means operable to cause said photo-electric means to deenergize first one and then the other of said two circuits, current control means operable to various application positions to supply different degrees of current to said winding and operable toward a release position to diminish the supply of current to said winding, means responsive to deenergization of both of said circuits for operating said current controlling means to an application position, means responsive to subsequent energization of one of said two circuits for retaining said current controlling means in an application position, means responsive to subsequent energization of both of said two circuits for operating said current controlling means toward release position, and means operated according to the rate of retardation of the vehicle for causing said photo-electric means to energize first one and then the other of said two circuits.

9. In a vehicle brake system, in combination, an electric brake device operable according to the degree of energization thereof, a fluid pressure brake device operable according to the degree of fluid under pressure supplied thereto, a controller device operable through one application zone to control the degree of energization of said electric brake device and operable through another zone to control the supply of fluid under pressure to the fluid pressure brake device, a retardation controller device operated according to the rate of retardation of the vehicle, and means controlled by said retardation controller device for controlling operation of said first controller device.

10. In a vehicle brake system, in combination, an electric brake device operable to produce a braking effect which diminishes as the speed of the vehicle diminishes, a brake cylinder, means for supplying fluid under pressure to the brake cylinder, a controller device operable to one application position to supply current to the electric brake device and operable to another application positon to effect a supply of fluid under pressure to the brake cylinder, a retardation controller device having a manually operated element and an inertia operated element operated according to the rate of retardation of the vehicle, and means controlled by said manually operated element for operating said controller device to application position to supply current to said electric brake device and controlled by said inertia operated element when the braking effect produced by said electric brake device diminishes to operate said controller device to said other application position to effect a supply of fluid under pressure to said brake cylinder.

11. In a vehicle brake system, in combination, an electric brake device operable to produce an electric braking effect which diminishes as the speed of the vehicle diminishes, a brake cylinder, means for supplying fluid under pressure to the brake cylinder, a control device operable to supply current to the electric brake device and to prevent fluid under pressure being supplied to the brake cylinder while the electric brake device is effective and operable to effect a supply of fluid under pressure to the brake cylinder when the electric brake device becomes relatively ineffective, a retardation controller device having a first member manually movable to a position according to a desired rate of retardation and having a second member movable according to the rate of retardation of the vehicle, means responsive to manual movement of said first member for operating said control device to supply current to said electric brake device, and means responsive to movement of said second member due to decrease of the electric braking effect for causing said control device to effect a supply of fluid under pressure to the brake cylinder.

12. In a vehicle brake system, in combination, an electric brake device, a brake cylinder, means for supplying fluid under pressure to the brake cylinder, a control device operable through one zone to supply current to the electric brake device and operable through another zone to effect a supply of fluid under pressure to the brake cylinder, a retardation controller device operated according to the rate of retardation of the vehicle, means controlled by said retardation controller device for controlling operation of said control device, and means operated by fluid under pressure supplied to the brake cylinder for deenergizing the electric brake device.

13. In a vehicle brake system, in combination, an electric brake device, a brake cylinder, means for supplying fluid under pressure to the brake cylinder, a control device operable through one zone to supply current to the electric brake device and operable through another zone to effect a supply of fluid under pressure to the brake cylinder, a retardation controller device operated according to the rate of retardation of the vehicle, means responsive to operation of said retardation controller device at a chosen rate of retardation for operating said control device, manually operated means for varying at what rate said control device is operated by said retardation controller device, a control element normally subject to pressure manually applied by the operator, and means responsive to release of pressure manually applied to said element by the operator for effecting operation of said control device to produce a maximum braking effect.

14. In a vehicle brake system, in combination, an electric brake device, a brake cylinder, means for supplying fluid under pressure to the brake cylinder, a control device operable through one zone to supply current to the electric brake device and operable through another zone to effect a supply of fluid under pressure to the brake cylinder, a retardation controller device operated according to the rate of retardation of the vehicle, means controlled by said retardation controller means for controlling operation of said control device, a control element normally subject to a constant pressure manually applied by the operator, means responsive to movement of said element by a different pressure for effecting a manual operation of said retardation controller device to effect an application of the electric brake device, and means responsive to release of the manually applied constant pressure on said control element for also effecting operation of the control device to apply the electric brake.

15. In a vehicle brake system, in combination, an electric brake device having a winding and being operable to produce a braking effect according to the degree of energization of said winding, two photo-electric means each of which has a light responsive current producing device and a light producing device impinging a beam of light on said light responsive device, means responsive to the currents produced by said photo-electric means for controlling energization of said winding, a body operated according to the rate of retardation of the vehicle, means operated by said body for interrupting first one and then the other of said two light beams, and means for varying the interval between interruption of said light beams.

16. In a vehicle brake system, in combination, an electric brake device, a control device for controlling the energization of said electric brake device, said control device being operable to various application positions to vary the energization of said electric brake device, a retardation controller device having a movable photo-electric means and a stationary photo-electric means and an inertia operated body coacting with said two means, means governed by the coaction of said inertia operated body with either of said photo-electric means for controlling operation of said control device, a relay operable when energized to render said movable photo-electric means effective in controlling said control device and operable when deenergized to render said stationary photo-electric means effective in controlling said control device, manually operated means having a control element for actuating said movable photo-electric means in accordance with a desired rate of retardation, safety control means normally subject to pressure manually applied by the operator, and means operable to energize said relay when pressure is manually applied to said safety control means and operable to deenergize said relay when pressure is released from said safety control means.

17. In a vehicle brake system, in combination, photo-electric means having two light responsive current producing devices and two light producing devices, each of said light producing devices being disposed in opposing spaced relationship to one of said light responsive devices and being operable to impinge a beam of light on that light responsive device, a body movable according to the rate of retardation of the vehicle, light interrupting means carried by said body, manually operated means for operating said photo-electric means in a linear pathway to positions where said light interrupting means interrupts the beams of light in said photo-electric means, means providing for movement of said body in a parallel linear pathway at a chosen rate of retardation far enough to actuate said light interrupting means to first reestablish one of said light beams and to then reestablish the other of said light beams, and means controlled by the currents produced in said light responsive devices by said light beams for controlling applications of the brakes.

18. In a vehicle brake system, in combination, a movable photo-electric means comprising at least one light responsive current producing device and at least one light producing device operable to impinge a beam of light on said light responsive device, a body operated according to the rate of retardation of the vehicle, light interrupting means carried by said body and operable to interrupt the beam of light produced by said light producing device, manually operated means for operating said movable photo-electric means to various positions where said light interrupting means interrupts the beam of light therein, means providing for movement of said body at a chosen rate of retardation for actuating said interrupting means to reestablish said beam of light, and means controlled by the current produced by said photo-electric means for controlling applications of the brakes.

19. In a vehicle brake system, in combination, a movable photo-electric means, a relatively stationary photo-electric means, each of said photo-electric means having at least one light responsive current producing device and at least one light producing device operable to impinge a beam of light on said light responsive device to cause a current to be produced thereby, a body operated according to the rate of retardation of the vehicle, light interrupting means carried by said body, said movable photo-electric means, having a biased position in which the beam of light therein is uninterrupted by said interrupting means and said relatively stationary photo-electric means having a biased position in which the beam of light therein is interrupted by said interrupting means, manually operated means for operating said movable photo-electric means to various positions according to a desired rate of retardation, said movement of said movable photo-electric means causing said interrupting means to interrupt the beam of light therein, means providing for movement of said body at said desired rate of retardation to a position where the light beam in said movable photo-electric means is again uninterrupted by said interrupting means, means providing for interruption of the beam of light in said stationary photo-electric means except at a maximum rate of retardation, braking means, and means controlled by the currents produced by said photo-electric means for controlling operation of said braking means.

20. In a vehicle brake system, in combination, an electric brake device, a control device operable in one direction to increase energization of the brake device and operable in an opposite direction to decrease energization of the brake device, a motor having an armature and a field winding and being operable to operate said control device in either of said directions, a first circuit for supplying current to said armature, a second circuit for supplying current to said field winding, two control circuits, means for supplying current to said two control circuits, means responsive to deenergization of both of said two control circuits for connecting both of said first and second circuits to a source of current supply to cause said motor to operate said control device in said first direction, means responsive to energization of one of said two control circuits for disconnecting said first and second circuits from said source to arrest movement of said control device, means responsive to energization of both of said two control circuits for reconnecting said first and second circuits to said source with current in one circuit reversed to cause said motor to operate said control device in said opposite direction, and means for controlling energiaztion and deenergization of said two control circuits.

21. In a vehicle brake system, in combination, electric brake means operable to produce a braking effect according to the degree of energization thereof, a control circuit, a source of light, light responsive means responsive to variations in the quantity of light supplied thereto by said source and adapted to control said control circuit, means controlled by said control circuit for controlling the degree of energization of said electric brake means, and means controlled according to the rate of retardation of the vehicle for controlling the quantity of light supplied to said light responsive means.

JOHN W. LOGAN, Jr.